United States Patent [19]

Gugler

[11] 4,388,060
[45] Jun. 14, 1983

[54] DOUGH ROLLING APPARATUS

[75] Inventor: Victor F. Gugler, Pinewood Springs, Lyons, Colo. 80540

[73] Assignee: Victor Gugler, Lyons, Colo.

[21] Appl. No.: 328,234

[22] Filed: Dec. 7, 1981

[51] Int. Cl.³ .................... B29C 15/00; A21C 3/02
[52] U.S. Cl. .................... 425/150; 425/367; 425/373
[58] Field of Search .............. 425/363, 373, 328, 374, 425/367, 150

[56] References Cited

U.S. PATENT DOCUMENTS

| | | | |
|---|---|---|---|
| 432,937 | 7/1890 | Glynn | 425/374 |
| 1,556,887 | 10/1925 | Winters | 425/367 |
| 1,650,758 | 11/1927 | Kukla | 425/374 |
| 2,735,379 | 2/1956 | Stiles | 425/102 |
| 3,391,655 | 7/1968 | Schafer | 425/374 |
| 3,709,650 | 1/1973 | Gutoski et al. | 425/367 |
| 3,753,638 | 8/1973 | Simpson | 425/374 |
| 3,894,828 | 7/1975 | Moline et al. | 425/363 |

*Primary Examiner*—Willard E. Hoag
*Attorney, Agent, or Firm*—Hugh H. Drake

[57] ABSTRACT

A sheet of dough is moved horizontally in a forward direction. A roller is moved from a first position, spaced above a portion of the sheet, generally downwardly into a second position in which said roller is pressed into said sheet. The roller is then moved in a forward direction a selected distance to a third position and during that movement the roller rotates to roll out and thin the dough. The roller is then returned to the first position.

18 Claims, 13 Drawing Figures

DOUGH ROLLING APPARATUS

The present invention pertains to dough rolling apparatus. More particularly, it relates to apparatus which accepts an oncoming sheet of dough and rolls it out so as to be ready for baking.

In preparing pastry, an individual working at home typically will mix the materials, knead the resulting dough and then use a rolling pin to form the dough into a sheet of the desired thickness. It is well understood that, besides the selection of the ingredients, variations in the amount and type of kneading can have significant effect upon the texture and other characteristics of the end product after the dough has been baked to form the pastry. The rolling operation, constituting an additional degree of kneading, also can effect such texture and other characteristics. With experience, a person who carries out the process manually learns to adjust the technique applied to each step in order to achieve the desired results.

In high-volume commercial production of pastries, various machinery must be employed. In designing such machinery, the attempt always has been to achieve a quality in the end product that at least approaches the quality of the "home-made" version. Often, consumers have been attracted to commercial pastries that are produced most closely in accordance with home-like techniques.

In the commerical production of a pastry, the bulk mix of dough must somehow be shaped into a sheet form. Typically, that is accomplished by urging the pastry between a pair of counter-rotating rollers so as to deliver a sheet of the dough. While this approach usually will work resonably well when the rolled sheet is to be fairly thick, it suffers deficiencies when the ultimate sheet is to be comparatively thin. The rollers are carried by inflexible bearings. When adjusted to be closely spaced, the pressure against the dough is very large. It is difficult to set correctly that spacing, because the thickness of the incoming dough varies. As a result, the dough too often is ruptured or damaged.

It is, therefore, a general object of the present invention to provide dough-preparing apparatus which overcomes such deficiencies.

Another object of the present invention is to provide dough-working apparatus that duplicates the action of use of a hand-held rolling pin.

A further object of the present invention is to provide a new and improved dough rolling apparatus that is capable of being adapted to conventional machines which deliver a thick sheet of dough.

Still another object of the present invention is to provide a new and improved dough rolling apparatus which increases the capability of machinery that produces sheets of dough.

A still further object of the present invention is to provide a dough rolling apparatus that is extremely gentle in its operation upon the final formation of the dough into a product ready for baking.

In accordance with the leading aspects of the present invention, a dough rolling apparatus includes means for moving a sheet of dough horizontally in a forward direction toward a roller. The roller is moved from a first position, spaced above a portion of that sheet, generally downward into a second position in which the roller is pressed into the sheet. The roller is then moved in the forward direction a selected distance to a third position, the roller rotating to roll out and thin the dough when moving between those second and third positions. The roller is then returned from the third position to the first position.

As more particularly embodied, the apparatus includes a generally horizontal framework. One end of that framework is removably mounted to an underlying substrate. The other end of the framework is movable controllably toward and away from the substrate. A roller is supported in rotation from said framework. Guiding means are affixed to the framework and coupled to the supporting means for enabling movement of the roller between fore and aft positions relative to the framework. A motive power source is coupled to the supporting means for reciprocating the roller between those fore and aft positions. Movement is controlled so that the framework moves away from the substrate during the interval in which the roller is moved from the forward position to the aft position while the other end of the framework is moved toward the substrate at least substantially prior to movement of the roller from the aft position back to the forward position.

The features of the present invention which are believed to be patentable are set forth with particularity in the appended claims.

The organization and manner of operation of the invention, together with further objects and advantages thereof, may best be understood by reference to the following description taken in connection with the accompanying drawings, in the several figures of which like reference numerals identify like elements, and in which.

Figure 1A:
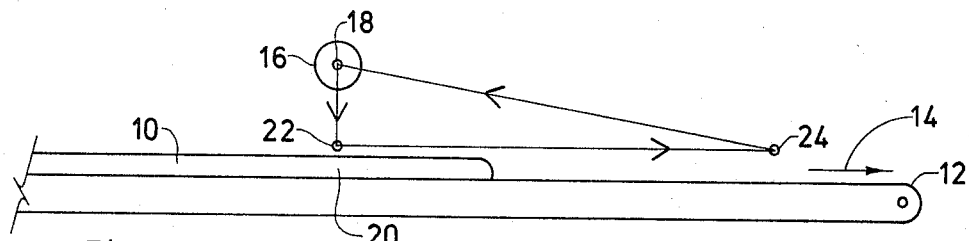
FIG. 1a through 1g are a schematic representations which illustrate certain principles of one implementation of the present invention.
Figure 1B:
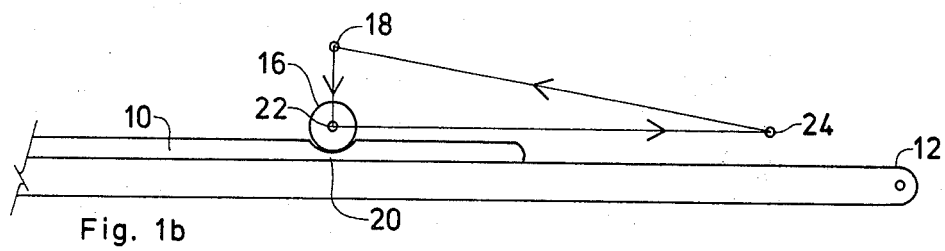
Figure 1C:
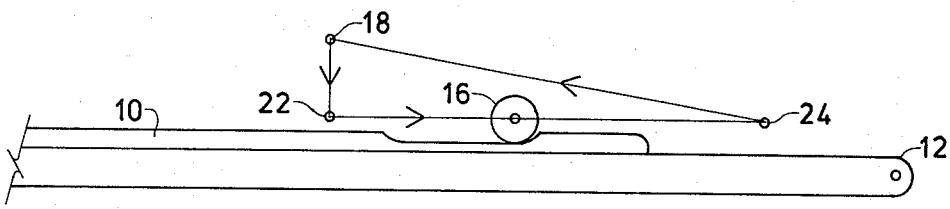
Figure 1D:
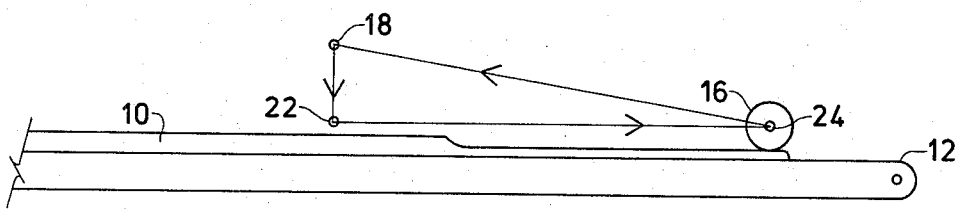
Figure 1E:
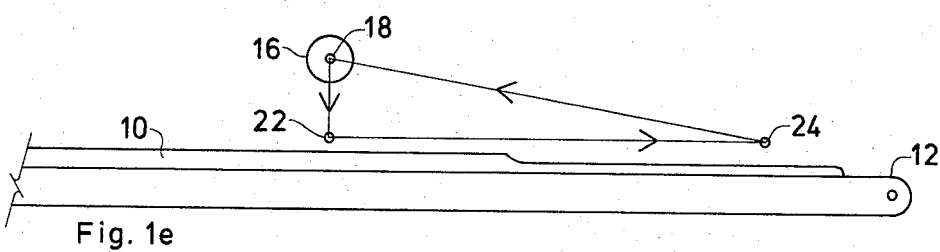
Figure 1F:
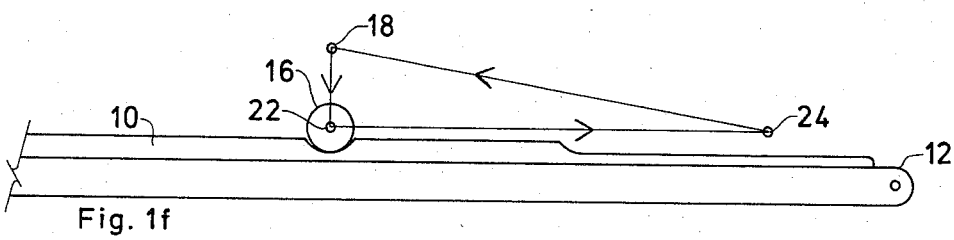
Figure 1G:
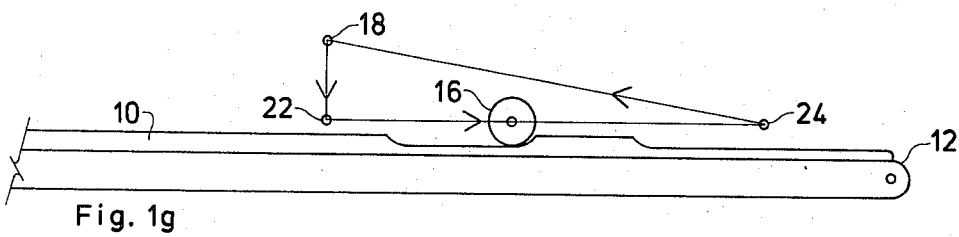
Figure 2:
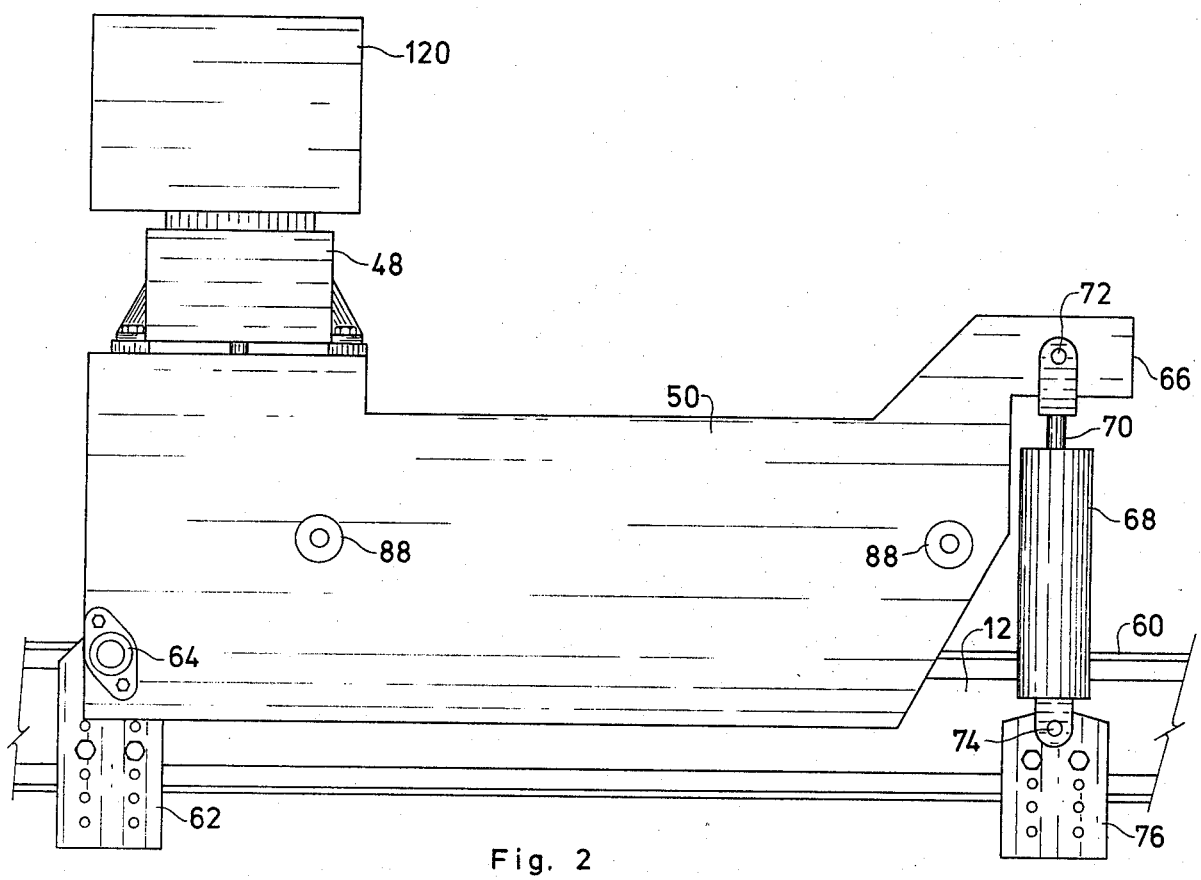
FIG. 2 is a side elevational view of apparatus in accordance with one embodiment of the present invention.
Figure 4:
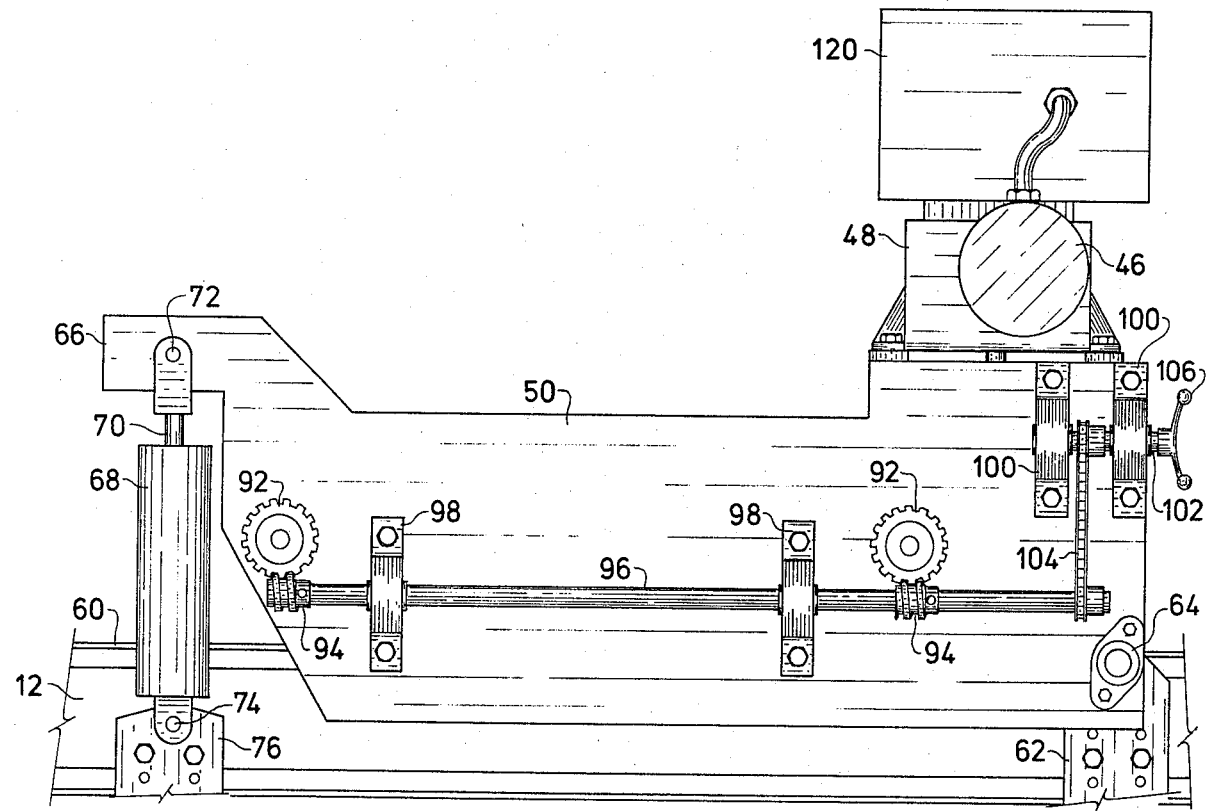
FIG. 4 is an opposite side elevational view of the apparatus.
Figure 3:
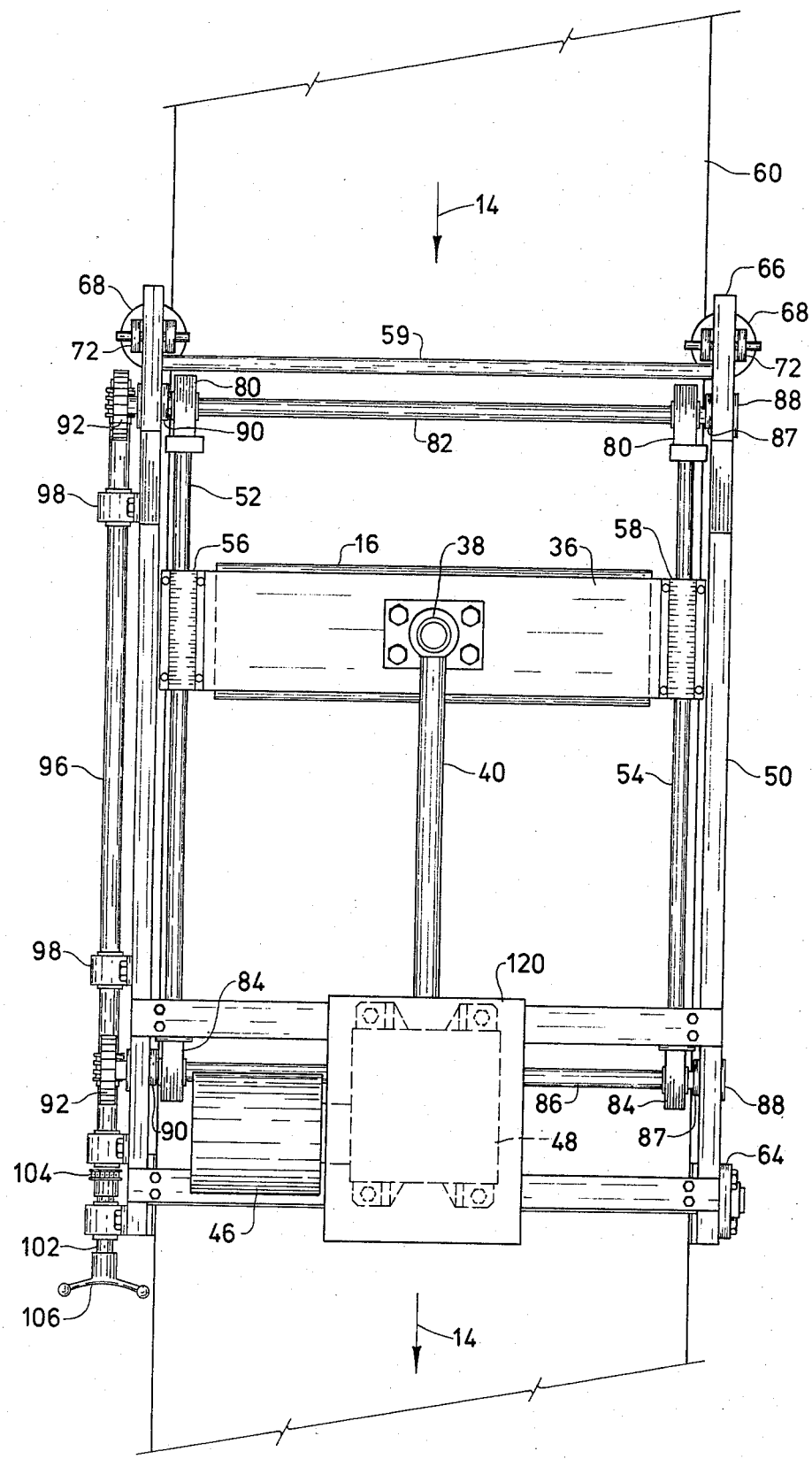
FIG. 3 is a top plan view of the apparatus.
Figure 5:
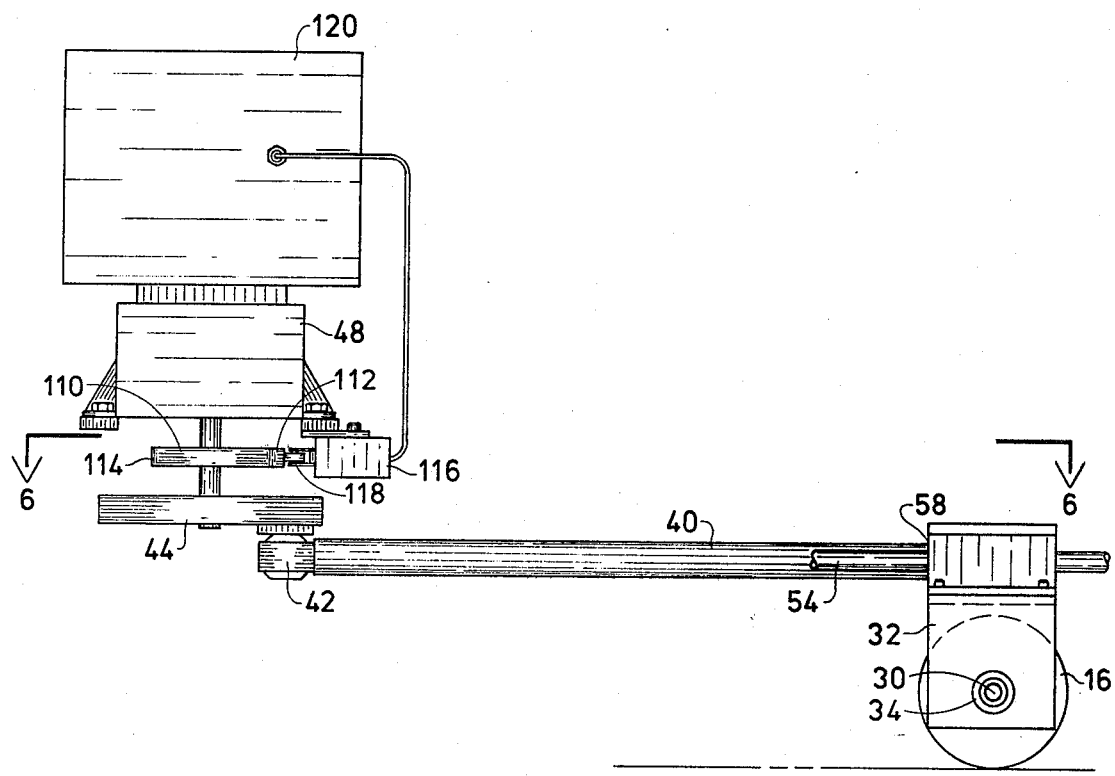
FIG. 5 is a fragmented side elevational view of a sub-assembly included within the apparatus.
Figure 6:
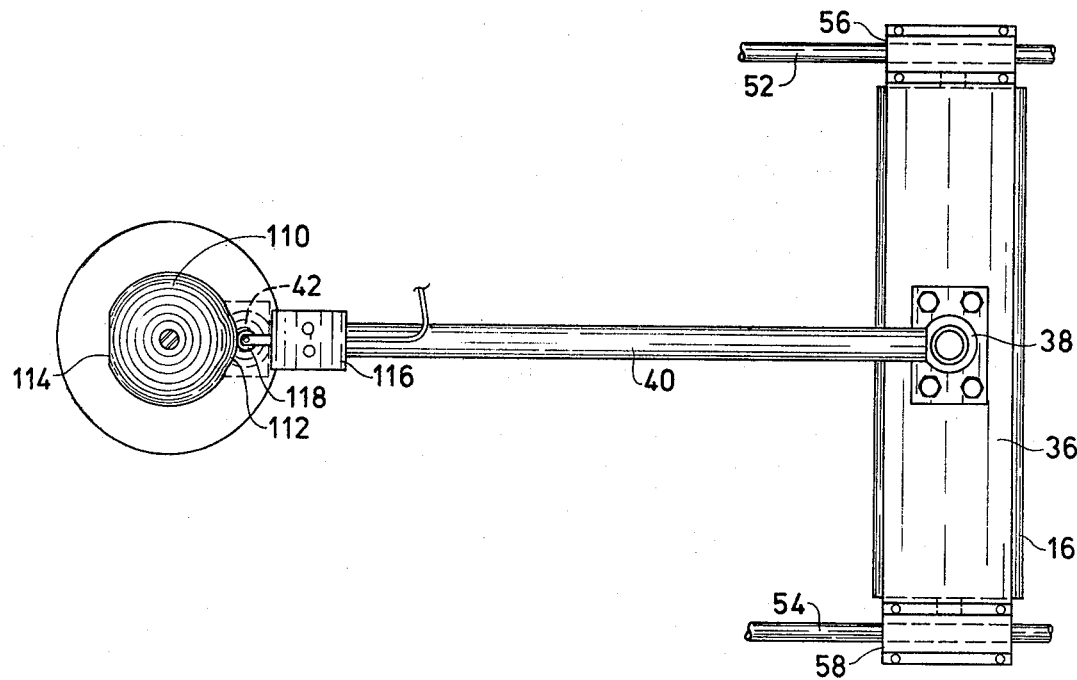
FIG. 6 is a cross-sectional view taken along the line 6—6 in FIG. 5.

In FIGS. 1a-1g, a comparatively thick sheet of dough 10, as might be delivered from conventional counter-rotating rollers, often called "sheeters", is carried upon a conveyor 12 and moved in a forward direction as indicated by the arrow 14. A roller 16 is freely rotatable about its longitudial axis. Roller 16 is controlled to move from a first position 18 that is spaced above a portion 20 of sheet 10 (FIG. 1a). That movement is generally downward into a second position 22 in which roller 16 is pressed into sheet 10 (FIG. 1b). As indicated by the arrows, roller 16 is then moved in forward direction 14 a selected distance to a third position 24 (FIGS. 1c to 1d). During that movement from position 22 to position 24, as illustrated in the succession of figures, the sheet of dough is rolled out and thinned by rotation of the roller. Upon reaching position 24, roller 16 is then returned to first position 18 (FIG. 1e).

Thereafter, the sequence of movement is repeated. The roller is caused again to move downward from position 18 to position 22, take a new "bite" of the material of sheet 10 at 20a (FIG. 1f) and then roll it out while progressing from position 22 toward position 24 (FIG.

1g). In effect, the movement of the roller is very much like that of a home baker in preparing a pastry through the use of a hand-held rolling pin.

A preferred mode of implementing the principles illustrated by FIG. 1 are shown in the remaining figures of the drawings. Roller 16 has an axle 30 about which roller 16 is rotatable. Brackets 32 are mounted by sleeve bearings 34 on respective ends of axle 30. A cross plate 36 is secured between brackets 32. Pivotally-connected at the center of plate 36 by a universal joint 38 is one end of a connecting rod 40. At its other end, connecting rod 40 is pivotally connected eccentrically by a universal joint 42 to a wheel 44. Wheel 44 is driven in rotation by a variable-speed motor 46 through a gear box 48.

A framework 50 has opposing sidewalls that carry space-opposed guiding rails 52 and 54. Affixed on the outer ends of plate 36 above axle 30 and brackets 32 are respective linear bearings 56 and 58. Bearings 56 and 58 are ensleeved to ride along rails 52 and 54. Motor 46 is mounted upon framework 50 as is gear box 48. A tie rod 59 secured between the sidewalls rigidifies the aft end of the framework.

Framework 50 is detachably mounted atop conveyor 12. Conveyor 12 includes a belt 60 movable in direction 14 (FIGS. 1 and) so as to move dough in a direction toward framework 50. Secured on either side of the frame of conveyor at the forward end of framework 50 are vertically-adjustable upstanding brackets 62. A pivot bearing 64 in each sidewall of framework 50 near its forward lower corner supports the framework from the conveyor frame by way of brackets 62 and allows the aft end 66 of the framework to tilt up and down about the axis of bearings 64.

At the aft end 66 of framework 50 are air cylinders 68. Each ram 70 is pivotally coupled at 72 to the upper rear corner of framework 50, while its housing is pivotally secured at 74 to the structure of conveyor 12 by way of an upstanding vertically-adjustable bracket 76. Rams 70 may be extended and contracted to move end 66 of framework 50 toward and away from the substrate represented by conveyor belt 60.

The aft ends of rails 52 and 54 are secured to respective bearing blocks 80 journaled near corresponding ends on a cross shaft 82. Similarly, the forward ends of rails 52 and 54 are secured in respective bearing blocks 84 journaled near corresponding end portions of a cross shaft 86. Shafts 82 and 86 are each secured eccentrically at one end in a respective disc 87 located on the inside of one sidewall of framework 50. Each disc 87, in turn, is carried on an axle stub rotatably mounted through that one sidewall and terminating in a bearing 88. The other ends of shafts 82 and 86 are secured eccentrically in respective discs 90 located on the inside of the other sidewall of framework 50. Each disc 90, in turn, is carried on an axle stub rotatably mounted through that other sidewall and terminating in the bore of a corresponding gear 92.

Worms 94 respectively engage gears 92 and are carried on a rod 96 mounted for rotation on that other sidewall by bearings 98. Spaced above the forward end of rod 96 and rotatable in bearings 100 is a drive rod 102 coupled to rod 96 by a chain and sprocket assembly 104. A handwheel 106 on the forward end of drive rod 102 permits the rotation of all discs 87 and 90 about their axle stubs to raise or lower rails 52 and 54 relative to framework 50. In turn, that permits adjustment of the heighth of spacing of roller 16 above conveyor belt 60 and, thus, the ultimate thickness of the dough being rolled.

In this case also mounted on the output shaft of gear box 48 is a rotary cam 110 that contains space-opposed, reversely-directed cam surfaces 112 and 114. Mounted adjacent to cam 110 is a sensor 116 in the form of a microswitch that has an arm 118 engageable with surfaces 112 and 114 to actuate the microswitch. The latter is connected into a control box 120 seated atop gear box 48.

In operation, energization of motor 46 causes roller 16 to be reciprocated back and forth along rails 52 and 54. When roller 16 is moved to position 24 (FIG. 1), coaction between sensor 116 and surface 112 effects energization of cylinders 68 so as to raise the aft end of framework 50. Roller 16 is then returned to the first position 18 described in FIG. 1. At that position, surface 114 on cam 90 actuates sensor 116 so as to open a valve which allows air cylinders 68 to relax and return aft end 66 of framework 50 toward conveyor belt 60. That moves roller 16 downwardly so as to cause roller 16 to bite into the oncoming sheet of dough. The continued rotation of wheel 44 then drives roller 16 forwardly back to position 24. During that latter movement, the dough is rolled out and thinned. Thereafter the process repeats over and over.

Figure 7:
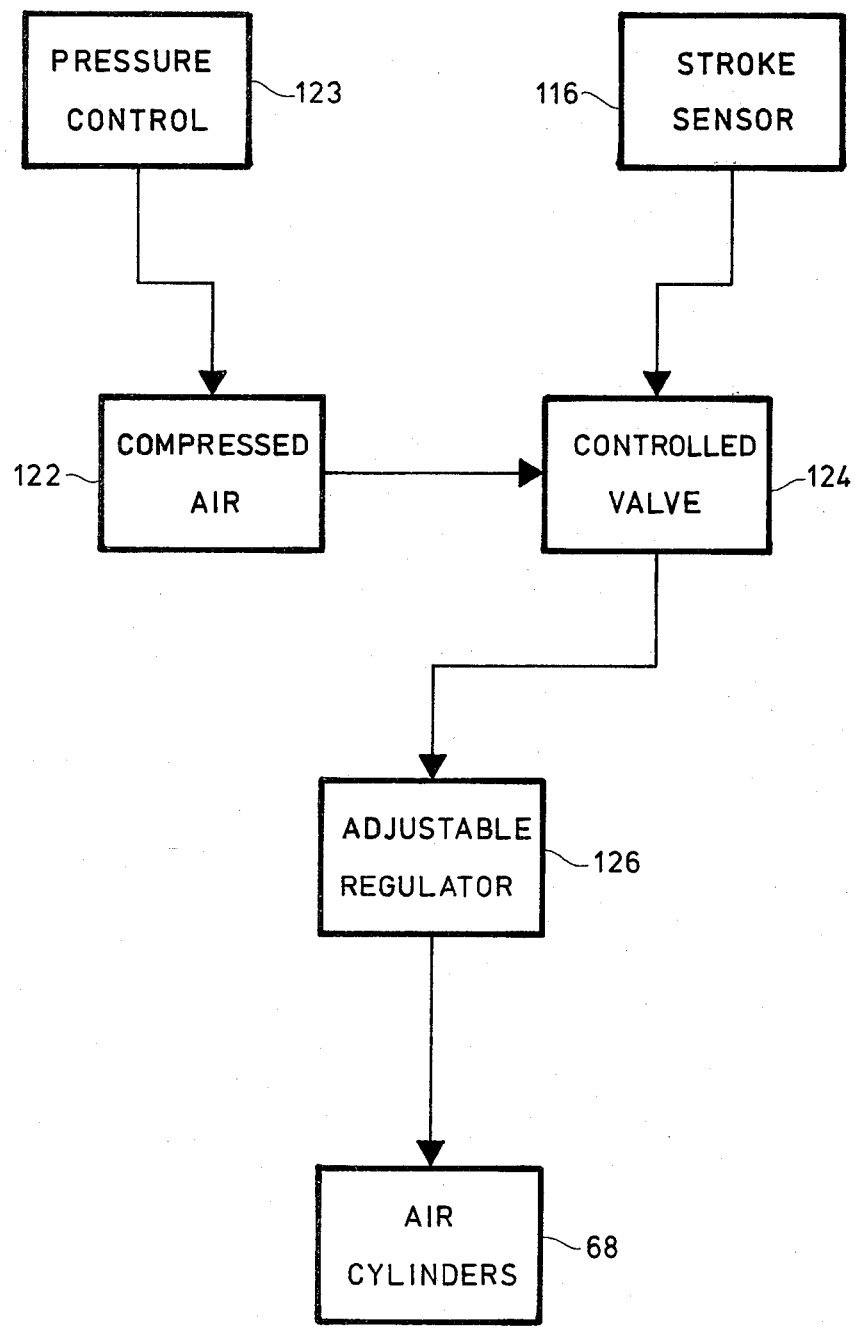
FIG. 7 is a block diagram of the control system.

The various air hoses and couplings have been omitted from the drawings for clarity of illustration. However, the interconnections are shown in FIG. 7. A source 122 of compressed air, with a pressure control 123, may be either an external supply of a compressor powered by motor 46. Air from source 122 is fed through a valve 124 controlled by sensor 116. The air outletted from valve 124 is supplied through an adjustable regulator 126 to air cylinders 68.

Preferably, regulator 126 is of the variable orifice type. The level of pressure in source 122 is varied to achieve the desired degree of extension of rams 70. Regulator 126 is adjusted to vary the quantity of air flow and, thus, the tme-limited speed of elevation of the rams as they extend. In that way, the triangular pattern of roller movement, shown in FIG. 1, is readily obtained. Of course, the top and left sides of the triangular pattern are not strictly straight lines, because aft end 66 swings about the pivots at 64.

In a successful prototype, roller 16 has a diameter of four inches and a length of thirty-six inches. The distance between positions 18 and 22 is typically five inches. The stroke length is about eight inches.

Air cylinders 68 may have as their substitutes any type of mechanical motivator for swinging framework end 66 about pivots 64. The use of air is preferred over liquid hydraulics for the initial reason that it allows much faster reciprocation or swinging movement. In addition, there is no danger of contamination from operating liquids.

More importantly, perhaps, is that cylinders 68 exert a yielding pressure upon roller 16. Like the rolling of dough by hand, the downward force exerted is relaxed before the dough is ruptured or damaged. That is, the amount of pressure effected inherently adapts to the characteristics of the dough. Even when the amount of flow of the dough is incorrect for achieving best overall results, the dough is not damaged.

Motor 46 also may be either air-operated or electrically energized. While it might be desirable to take advantage of the presence of compressed air necessary to operate air cylinders 68, it is presently preferred to utilize an electric motor for driving the overall reciprocation in order to reduce expense and component size and to easily allow selective adjustment of the rate of repetition.

The function of sensor 116 could take any of a variety of forms. It might be a microswitch as shown, magnetically interactive elements, a photoelectric system and so forth. Moreover, the function of sensor 116 may be performd by deriving its sensing informatiom either from the rotation of the shaft of motor 46, from the reciprocating movement of roller 16 or from any of its connecting linkage.

Instead of a connecting-rod type of reciprocation of roller 16, it will be apparent that another type of actuator may be employed and similarly sequenced with respect to actuation of cylinders 68. For example, a ram may be used to reciprocate roller 16 in the horizontal direction.

As embodied, rails 52 and 54 are parallel. In one alternative, rails 52 and 54 diverge apart in the forward direction. This is accommodated by constructing shafts 82 and 86 of telescoping tubes. This arrangement permits use of a wider incoming sheet of dough, recognizing that the dough spreads laterally as it is rolled.

It may be noted that sleeve-type bearings are illustrated at all points of pivoting or rotation. While other kinds of bearing structure, such as roller bearings, might be substituted, it is believed to be best to employ that form of bearing in view of the environment that involves the presence of the dust created by the use of flour in the pastry-making process.

In suggesting several different alternatives that might be incorporated in whole or in part in the overall structure, it becomes apparent that still other modifications might be made while yet allowing the new result to be achieved. Nevertheless, that which has been described in detail and illustrated is believed to represent the best mode of achieving the objectives.

That which has been described permits roller 16 to function essentially like that of a hand-held rolling pin as one might historically have rolled out dough. As is necessary to produce the desired texture in a crust or the like, the action of roller 16 as controlled by the illustrated apparatus is extremely gentle on the dough. The ultimate result is a capability of producing a pastry product that comes as close as possible to a home-made product.

Brackets 62 and 76 enable the apparatus to be attached to a wide variety of already-present sheet-conveying apparatus. Modification of existing sheeting apparatus is not required. On the other hand, the addition of the herein disclosed apparatus to a pastry-making operation increases the ability of preceding sheeters to perform their task of transforming bulk dough into a generally sheet-like form. In some applications, the use of a preceding sheeter will be unnecessary.

As represented in FIG. 1, the path of movement of roller 16 is generally triangular. That is the preferred approach, because it enables the quickest return time. The illustrated described apparatus is capable of reciprocating at a rate of 150 to 200 repetitions per minute. However, and at some possible decrease in speed if not additional complexity, the return path would not have to complete a triangle. It could, for example, involve first raising roller 16 above position 24 and then returning it to position 18.

While a particular embodiment of the invention has been shown and described, and various modifications and alternatives have been taught, it will be obvious to those skilled in the art that further changes and modifications may be made without departing from the invention in its broader aspects. Therefore, the aim in the appended claims is to cover all such changes in modifications as fall within the true spirit and scope of that which is patentable.

I claim:

1. Dough rolling apparatus comprising:
   means for moving a sheet of dough horizontally in a forward direction;
   a roller;
   and means for moving said roller from a first position, spaced above a portion of said sheet, generally downwardly into a second position such that said roller is pressed into said sheet as said sheet is moving in said forward direction, said roller being movable in said forward direction a selected distance to a third position with said roller rotating to roll out and thin said dough when both said sheet and said roller are moving between said second and third positions, and then returning said roller to said first position, said roller being mounted for generally horizontal movement along a framework which has means to support said roller and which support means enables said roller to be oscillated generally vertically with respect to said sheet under operation of a connected actuating means which effects said oscillation.

2. Apparatus as defined in claim 1 in which the movement of said roller sequentially between said different positions is repetitive, and in which the rate of repetition is selectively adjustable.

3. Apparatus as defined in claim 1 which includes means for adjusting the amount of depression of said roller into said sheet during movement between said second and third positions.

4. Apparatus as defined in claim 1 in which the path of movement of said roller sequentially between said different positions is generally triangular.

5. Apparatus as defined in claim 1 which includes means for adjusting the speed of elevation of said roller when returning to said first position.

6. Apparatus as defined in claim 1 in which said moving means exerts pressure upon said dough yieldingly in adaptation of the characteristics of said dough.

7. Apparatus as defined in claim 6 in which said moving means includes an air-operated cam.

8. Dough rolling apparatus comprising:
   a generally horizontal framework;
   means for pivotally mounting one end of said framework to an underlying substrate;
   means for moving the other end of said framework controllably toward and away from said substrate;
   a roller;
   means supporting said roller for rotation thereof;
   guiding means affixed to said framework an coupled to said supporting means for enabling movement of said roller between fore and aft positions relative to said framework;
   a motive power source coupled to said supporting means for reciprocating said roller between said positions;
   and means for controlling said moving means to move said other end of framework away from said substrate during the interval in which said roller is moved from said fore position to said aft position and to move said other end of said framework toward said substrate generally prior to movement of said roller from said aft position back to said fore position.

9. Apparatus as defined in claim 8 in which said motive power source includes an element movable in synchronism with reciprocation of said roller, and in which said controlling means includes a sensor responsive to movement of said element.

10. Apparatus as defined in claim 8 in which said motive power source includes a wheel, connecting rod is pivotally connected at one end eccentrically to said wheel, and said connecting rod is pivotally connected at its other end to said supporting means.

11. Apparatus as defined in claim 8 in which said guiding means includes a pair of space-opposed rails and in which said supporting means includes a pair of bearings individually engaged with respective ones of said rails.

12. Apparatus as defined in claim 8 in which said moving means includes a linear actuator coupled between said substrate and said other end of said framework.

13. Apparatus as defined in claim 8 which includes means for selectively adjusting the rate at which said motive power source reciprocates said roller.

14. Apparatus as defined in claim 8 in which said mounting means and said moving means are detachably securable to said substrate.

15. Apparatus as defined in claim 8 which includes means for adjusting the distance said other end of said framework is moved toward said substrate.

16. Apparatus as defined in claim 8 which includes means for selectively adjusting the speed of operation of said moving means.

17. Apparatus as defined in claim 8 in which said moving means exerts pressure upon said dough yieldingly in adaptation of the characteristics of said dough.

18. Apparatus as defined in claim 17 in which said moving means includes an air-operated ram.

* * * * *